Patented Jan. 16, 1945

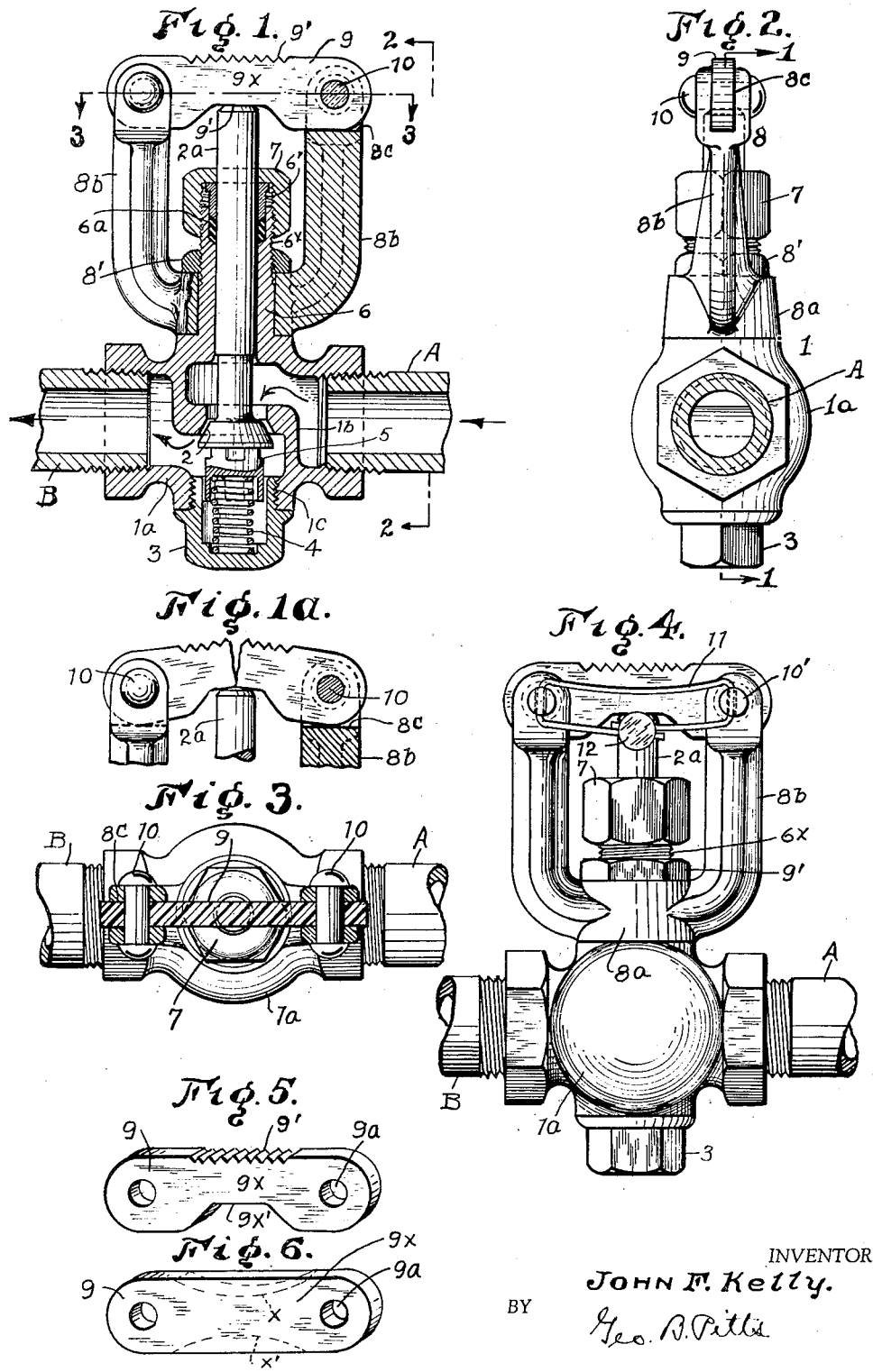

2,367,402

UNITED STATES PATENT OFFICE 2,367,402

VALVE CUTOFF

John F. Kelly, Cleveland, Ohio

Application July 30, 1943, Serial No. 496,702

1 Claim. (Cl. 137—161)

This invention relates to a valve, more particularly to valve control means having a releasable member for maintaining the valve open but automatically operable to close the valve in the event excessive temperature conditions take place in the area thereof. The valve is adapted to permit or stop the flow of a fluid through a pipe in a building for example, liquid fuel used for heating purposes or gas which is or may be used for heating and/or lighting purposes, at different locations in the building, the control means being operable to close the valve in the event of fire to eliminate dangerous conditions which would follow if the fluid flow continued.

In valves capable of automatically closing due to excessive heat conditions, of which I have knowledge, the release devices or the mountings thereof were of special construction so that difficulties arose and various tools were required in making replacements and in most instances the operation of soldering was required to re-set or replace the the parts with the valve in open position.

One object of the invention is to provide an improved valve control means of relatively simple construction and embodying a construction which permits re-setting and replacement of the release member or a substitute therefor, in a ready manner without the use of tools or other equipment.

Another object of the invention is to provide an improved valve control means having a releasable member mounted edgewise relative to the valve, thereby permitting the member to be made of various materials but capable of resisting the spring tension imparted to the valve element of the valve, to maintain the latter open.

Another object of the invention is to provide an improved valve control means having a releasable member engaging the valve element and so mounted that the quantity of the material required to be affected by the heat to release the valve may be varied without affecting the strength of the member to hold the valve element of the valve in open position.

Other objects of the invention will be apparent to those skilled in the art to which my invention relates from the following description taken in connection with the accompanying drawing, wherein Fig. 1 is a view of the control means embodying my invention and a valve, the latter being shown in section on the line 1—1 of Fig. 2.

Fig. 1a is a fragmentary view, partly in section, showing the position of the releasable member following the closing of the valve.

Fig. 2 is a view on the line 2—2 of Fig. 1.

Fig. 3 is a section on the line 3—3 of Fig. 1.

Fig. 4 is a view showing an arrangement for sealing the releasable member against tampering.

Fig. 5 is a perspective view of the releasable member.

Fig. 6 is a plan view of a blank formed of suitable material to serve as the releasable member.

In the drawing, 1 indicates as an entirety a valve, the casing 1a thereof having at its opposite ends threaded connections with pipes A, B. In the preferred arrangement the pipe B leads to the usual gas meter (not shown), whereas the pipe A is the gas intake from the street supply main and may be (in most instances is) provided with a cut-off (not shown). In this arrangement the valve 1 controls the supply of gas from pipe A to all service outlets in the building. The valve casing 1a is provided with an intermediate wall 1b which is formed with an opening. In the form of construction shown, the wall of the opening is ground to form a valve seat on its lower side, flow of gas is in the direction indicated by the arrows and the valve element 2 is moved downwardly (as viewed in Fig. 1) to unseat it and permit gas flow from pipe A to pipe B. Also, in the form of construction shown, the bottom wall of the casing 1a is formed with an internally threaded opening 1c, in alined relation to the valve seat, a cup member 3 being removably mounted in the opening 1c and enclosing a spring 4. The spring 4 is seated between the bottom wall of the cup member 3 and a thrust element 5, which engages the valve element 2, and normally tends to operate through the element 5 to move the valve element into engagement with its seat and thus close the valve. By preference the outer surface of the element 5 slidably engages the inner surface of the cup member 3 and its inner portion is cut away to form a seat for the upper end of the spring 4. The valve element 2 is suitably connected to a stem or shank 2a which extends upwardly through the valve opening and through and beyond a tubular extension 6 formed integrally with the wall of the valve casing, the stem 2a being guided endwise by the inner surface of the extension 6 to insure proper operation of the valve to meet specified requirements and test regulations in any locality where the valve may be installed. The upper end portion of the extension 6 is internally recessed, as shown at 6a, for a packing 6' and externally threaded as shown at 6x to receive an internally threaded cap 7 arranged to compress the packing to seal the extension 6. By screwing the cap 7 downwardly the packing may be compressed to any desired degree to prevent any leakage of the gas in the system. It will be understood that the construction of the valve forms no part of my invention and may therefore be constructed in any well known or preferred form.

8 indicates as an entirety the control means for the valve whereby its valve element is held open or unseated but operable to permit seating of the valve in the event abnormal heat conditions arise. In the form of construction shown, the control means comprises an attachment removably mounted on the valve, the exemplified construction being provided with a collar 8a arranged to fit over and engage the outer wall of the extension 6, this arrangement permitting a nut 8' fitting the screw threads 6x to be tightened against the collar to secure it on the extension 6 against the body of the valve. 8b indicates a pair of arms which are formed integrally with the collar 8a and extend upwardly therefrom at diametrical opposite sides of the valve stem 2a to a point slightly above the upper end thereof. The upper ends of the arms 8b are formed with alined slots 8c, the side walls of which are substantially equally spaced from an imaginary plane cutting the axis of the valve stem 2a. The walls of the slots 8c form seats for the opposite ends of a releasable member 9, so that when the latter is mounted in the slots and secured therein, as later set forth, the member 9 bridges the space between the arms 8b and is engaged by the valve stem 2a to hold it in a predetermined position with the valve in unseated position against the tension of the spring 4, to permit free flow of the gas from pipe A to pipe B. The releasable member 9 is cut, stamped or molded from stock formed of any material which becomes deformed at a relatively low temperature such as a plastic material; for example, in testing a valve I have used a plastic known as Vinylite which upon being subjected to a temperature of 135 degrees F. softened and became deformed sufficiently to effect shut-off of the valve in one and one-half minutes. This material is advantageous since it does not melt and then adhere to parts of the valve and the release means but has a substantially stabilized composition; that is, it is stable dimensionally, it is non-flammable, it has a very low moisture absorption characteristic; that is, substantially non-hygroscopic, so that danger of warping or swelling is not present, and softens at a low temperature; hence danger of the releasable member deteriorating even where the meter and the cut-off valve are mounted exteriorly of the building, an arrangement customary in some localities, is eliminated. The side walls of each slot 8c are formed with alined openings to receive a pin or other device 10 which extends therethrough and an opening or recess 9a formed in the adjacent end of the member 9 to secure the latter in the arms 8b. As shown the slots 8c are open at the upper ends of the arms 8b to permit ready positioning of the member 9. It will be observed that the slots 8c support the member 9 edgewise, that is, in a plane coincident with the direction of movement of the valve stem. In this arrangement the tension of the spring is exerted edgewise of the member 9, which insures adequate resistance thereof to this tension, and at the same time permits the member to be relieved or cut away to any desired degree to reduce the amount of material required to be deformed or weakened to release the valve stem 2a. As shown in Fig. 6, the member 9 may be stamped out of sections of sheet stock formed of a material having a predetermined breakdown point and then that side edge portion opposite the edge 9' to be engaged by the valve stem may be cut away to any desired extent, as shown in dotted lines at x thereby reducing the area 9x between the edge 9' and the side edge of the cut away. Accordingly in the event of a fire or a temperature rise equal to or in excess of the break-down point of the member 9, while all exposed portions of the member 9 will be affected by the heat, the area of 9x will become weakened and yield or break or spread apart in this area, (see Fig. 1a) and thus release the valve stem 2a to close the valve under the influence of the spring 4 in advance of the heat effect on other portions of the member 9. It will thus be seen that the area 9x can be adjusted or varied to meet varying conditions.

It will be noted that the bottom walls of the slots 8c are in a plane below the upper end of the valve stem 2a when the latter is in valve unseated position. Accordingly, when a releasable member 9 is to be assembled in the arms 8b, its edge 9' may be cut away such as indicated by the dotted line x' so that when the member 9 is secured in fixed position in the arms and the stem 2a is in engagement with the member 9, as shown in Fig. 1, the valve element 2 will be in full open position. It will be obvious that the arms 8b may be formed integrally with the extension 6. In this arrangement or where the control means constitute an attachment (as already set forth) the parts thereof may be assembled at the factory, the releasable member being cut away at 9x' and engaging the valve stem to hold the valve element in unseated position. However, when the member 9 is supplied for replacement purposes, its intermediate portion 9x is of maximum width (see Fig. 6), so that the user may cut either or both side portions, varying amounts so as to hold the valve stem inwardly and the valve set in full open position and regulate the area of the material to be weakened to effect release of the valve stem.

When the parts are assembled at the factory, I prefer to secure the member 9 to the arms 8b by rivets (which may also be formed of material similar to that of the member 9) which can be used to indicate any tampering with the member to dislodge it. Where replacement becomes necessary pins 10' (which may be formed of wood, plastic or other material) may be employed and these pins may be bored to receive a wire 11, the ends of which are sealable by a slug 12. By reason of the fact that the releasable member is mounted on the arms in edgewise relation to the valve stem, it is apparent that in making a replacement various materials may be employed to meet emergency or temporary conditions; for example, a section of lead alloy or a section of thin wood (preferably of a light cellulose character) and the latter in turn may be coated with a substance (such as resin) having a low ignition point.

While I have shown and described a valve for a gas supply system, it will be understood that the cut-off means may be applied to a valve for a liquid supply system.

To those skilled in the art to which my invention relates many changes in construction and widely differing applications thereof will be apparent without departing from the scope of the invention. My disclosures and the description herein are purely illustrative and not intended to be in any sense limiting.

When it is desired to cut off the fluid flow through pipe B and the system connected therewith, for example, during repairs to the fluid system, one rivet or pin 10 may be removed and thereafter the member 9 swung upwardly, such operation permitting the valve to close. To reset the valve, the member 9 is returned to its first position and secured by the pin 10 or a new pin. It will be noted that either pin 10 may be removed under these circumstances.

By using a releasable member cut or stamped from sheet stock or molded in this form, and mounting it edgewise with respect to the direction of movement of the operating member connected to the valve element of the valve, adequate resistance or strength is provided to hold the valve element in open position.

It will be observed that by supporting the releasable member in the manner disclosed, it is freely exposed in the surrounding area.

What I claim is:

A valve having a movable member operatively connected to the valve element of the valve and means normally tending to seat said valve element, in combination with releasable means engaging said movable member to maintain said valve element in unseated position, said releasable means comprising a pair of arms mounted on the wall of the valve and disposed at diametrically opposite sides of said member and a section of non-fusible, non-flammable, substantially non-hygroscopic material capable of distortion under the influence of heat, mounted at its opposite ends in said arms and engaging said member to maintain it in a predetermined position with the valve element unseated, said material when distorted serving to permit operation of said movable member and seating of the valve element by said first mentioned means.

JOHN F. KELLY.